UNITED STATES PATENT OFFICE.

FRANK S. WASHBURN, OF BALTIMORE, MARYLAND, ASSIGNOR TO AMERICAN CYANAMID COMPANY, OF BALTIMORE, MARYLAND, A CORPORATION OF MAINE.

PROCESS OF PRODUCING PHOSPHORUS PENTOXID AND CEMENTITIOUS PRODUCTS.

1,000,311.     Specification of Letters Patent.     Patented Aug. 8, 1911.

No Drawing.     Application filed February 25, 1911. Serial No. 610,860.

*To all whom it may concern:*

Be it known that I, FRANK S. WASHBURN, a citizen of the United States, residing at Baltimore, State of Maryland, have invented certain new and useful Improvements in Processes of Producing Phosphorus Pentoxid and Cementitious Products; and I do hereby declare the following to be a full, clear, and exact description of the invention, such as will enable others skilled in the art to which it appertains to make and use the same.

This invention relates to the production of phosphorus pentoxid and a cementitious product useful in wall plasters, etc., and has for its object the separation of the phosphorus pentoxid and the alumina contained in crude natural phosphates of aluminum in such a manner that the said alumina becomes a useful industrial product, all as will be more fully hereinafter disclosed and particularly pointed out in the claims.

It is well known that phosphates of aluminum at present are rendered industrially useful by heating alone or by treating the same with sulfuric or other strong mineral acids. But the heating process does not result in the production of the alumina in the form of a useful product, nor does it produce the phosphoric acid in a form of material industrial value, for agricultural purposes, since the said acid thus produced is so combined that it rapidly reverts to its original form when used in the soil as an agricultural phosphate. Likewise, when the crude phosphate is subjected to treatment with strong mineral acids the resulting mixture of aluminum sulfates and phosphoric acids are mutually injurious to each other so far as any industrial use of consequence is known at this time. Further, so far as I am aware, no commercial practical process for separating the alumina in a form constituting a useful product in itself from the phosphoric acid is known at this time. By my process about to be described, however, the alumina is recovered in the form of a calcium aluminate and the oxids of phosphorus are produced in a form which is industrially valuable, so that the entire cost of operation of the process together with the raw materials used represents a much less cost than the commercial value of the resulting products.

In carrying out my process I mix together crude phosphates of aluminum and crude phosphates of calcium, in such proportions that in the resulting mixture one chemical equivalent of alumina, $Al_2O_3$, is associated with not less than one equivalent of lime, CaO. This mixture of cheap natural phosphates is then pulverized and treated to a calcination process, preferably in a rotary kiln such as is used in the manufacture of Portland cement and at temperatures sufficiently high to effect a sublimation of the phosphorus pentoxid $P_2O_5$ present, but the temperature should not be permitted to greatly exceed 1700° centigrade.

The phosphorus pentoxid is accordingly sublimed in the kiln and it passes off with the kiln exit gases, whereupon it is recovered by means of any suitable ordinary absorption towers or gas scrubbers. The lime, alumina, etc., left in the kiln is in the form of a sintered mass consisting largely of calcium compounds high in calcium aluminate which is of considerable industrial value for use as a cementitious material, and especially in the making of plasters for use upon walls.

In actual operation of the process the crude phosphates may be proportioned as follows, using for this illustration one chemical equivalent of alumina $Al_2O_3$ to two chemical equivalents of lime CaO:—

Contents of—

|  | Natural Alumina Phosphate. | Natural Lime Phosphate. |
|---|---|---|
| Lime (CaO) | 5 pct. | 47 pct. |
| Alumina ($Al_2O_3$) | 32 " | 2 " |
| Ferric oxid ($F_2O_3$) | 8 " | 1 " |
| Silica ($SiO_2$) | 19 " | 9 " |
| Carbon dioxid ($CO_2$) | --- | 7 " |
| Phosphorus oxid ($P_2O_5$) | 35 " | 33 " |
| Insoluble constituents | 1 " | 1 " |
|  | 100 " | 100 " |

Now, in order that substantially all of the phosphorus pentoxid may be displaced and sublimed in the kiln, sufficient lime must be present in the calcined mixture to form compounds which, in this instance, will be as follows:—

For the—
Silica present, lime to form _____ $3CaOSiO_2$
Alumina present, lime to form ___ $2CaOAl_2O_3$
Ferric oxid present, lime to form _ $2CaOFe_2O_3$ If we use as a basis 1000 pounds of the natural alumina phosphate, which will contain, say 320 pounds of alumina, 80 pounds of ferric oxid, and 190 pounds of silica, we will then require 938 pounds of lime CaO to complete the reactions. But, as the 1000 pounds of natural alumina phosphate contains only about 50 pounds of lime, we must supply 888 pounds of lime from the natural lime phosphate. This latter, however, contains for each 1000 pounds, say 20 pounds of alumina, 10 pounds of ferric oxid, and 90 of silica, and it therefore requires for chemical combinations under the conditions set forth, 280 pounds of lime CaO. But, as the 1000 pounds of lime phosphate contains 470 pounds of lime, there remains for the natural aluminum phosphate 470 pounds less 280 pounds, or 190 pounds of lime. As, however, 888 pounds of lime are required for the 1000 pounds of the natural aluminum phosphate, it is evident that the required mixture in this illustration may be determined by dividing 888 by 190. In other words, it is evident that the required mixture will consist of—

| | |
|---|---|
| Natural alumina phosphate | 1000 lbs. |
| Natural lime phosphate | 4680 " |
| Total | 5680 lbs. |

The composition of the resulting clinker will be substantially as follows:—

| | | |
|---|---|---|
| Lime (CaO) | 65 | pct. |
| Silica ($SiO_2$) | 17 | " |
| Alumina ($Al_2O_3$) | 12 | " |
| Ferric oxid ($F_2O_3$) | 4 | " |
| Insoluble constituents | 2 | " |
| | 100 | " |

This mass high in calcium aluminate possesses cementitious properties which are of commercial value for plasters, etc., as above stated.

In the same way the quantity of phosphorus pentoxid $P_2O_5$ sublimed and removed with the exit gas can be shown to amount to 1895 pounds in the example stated. This is readily saved by a system of gas scrubbing towers, and in commercial value is worth much more than the total costs of the process. It, therefore, results that the cementitious calcium product containing calcium aluminate is produced substantially free from all costs.

What I claim is:—

1. The process of producing oxids of phosphorus and a cementitious product which consists in mixing crude phosphates of aluminum and of calcium; in calcining the mixture at a temperature sufficient to drive off the oxid of phosphorus leaving the cementitious product behind; and in suitably recovering the said oxid phosphorus, substantially as described.

2. The process of producing oxids of phosphorus and a cementitious product which consists in finely dividing and mixing crude phosphates of aluminum and of calcium in such proportions that one chemical equivalent of alumina $Al_2O_3$ will be associated with at least one chemical equivalent of lime CaO; in subjecting said mixture to a temperature sufficient to separate the phosphorus oxids from the alumina and lime; and in suitably recovering said phosphorus oxids, substantially as described.

3. The process of producing oxids of phosphorus and a cementitious product which consists in finely dividing and mixing crude phosphates of aluminum and of calcium in the proportions of substantially 1000 lbs. of the former to 4680 lbs. of the latter; in subjecting said mixture to a temperature not greatly exceeding 1700° C.; thereby driving off the contained oxid of phosphorus; and in suitably recovering the oxid of phosphorus thus sublimed, substantially as described.

In testimony whereof, I affix my signature, in presence of two witnesses.

FRANK S. WASHBURN.

Witnesses:
 FELIX R. SULLIVAN,
 S. HANNA.